United States Patent [19]
Marié

[11] 3,955,153
[45] May 4, 1976

[54] RING LASER FOR PENETRATING WAVES

[76] Inventor: Georges R. P. Marié, 17, rue Croland, 92260 Fontenay-aux-Roses, France

[22] Filed: Mar. 17, 1975

[21] Appl. No.: 559,154

[30] Foreign Application Priority Data
Mar. 21, 1974 France .............................. 74.09669

[52] U.S. Cl. ..................... 331/94.5 C; 356/106 LR
[51] Int. Cl.² ......................................... H01S 3/08
[58] Field of Search .............. 331/94.5; 356/106 RL

[56] References Cited
OTHER PUBLICATIONS
Itzkan, A Circular Ring Laser, Proc. of the IEEE (Feb. 1965) p. 164.

Primary Examiner—William L. Sikes
Attorney, Agent, or Firm—Abraham A. Saffitz

[57] ABSTRACT

A ring laser for penetrating electromagnetic radiation such as X or gamma rays, using a pumping beam supplied by a primary lightwave or infrared laser. A member made of active material is illuminated by the beam, which has symmetry of revolution around its axis and whose electric lines of force are circles centered on the said axis. The pumping beam is conveyed by a mirror toward the end of a circular metal channel having a semi-toroidal cross-section and containing the active member, the mirror being formed with an aperture near the axis and transmitting the X or gamma rays emitted by the active member after they have been propagated along the end of the channel. The active member may be made of a substance which can undergo thermonuclear fusion by absorbing X or gamma rays. The active substance may also be a boron hydride or a boronate.

2 Claims, 3 Drawing Figures

FIG.1
FIG.2
FIG.3
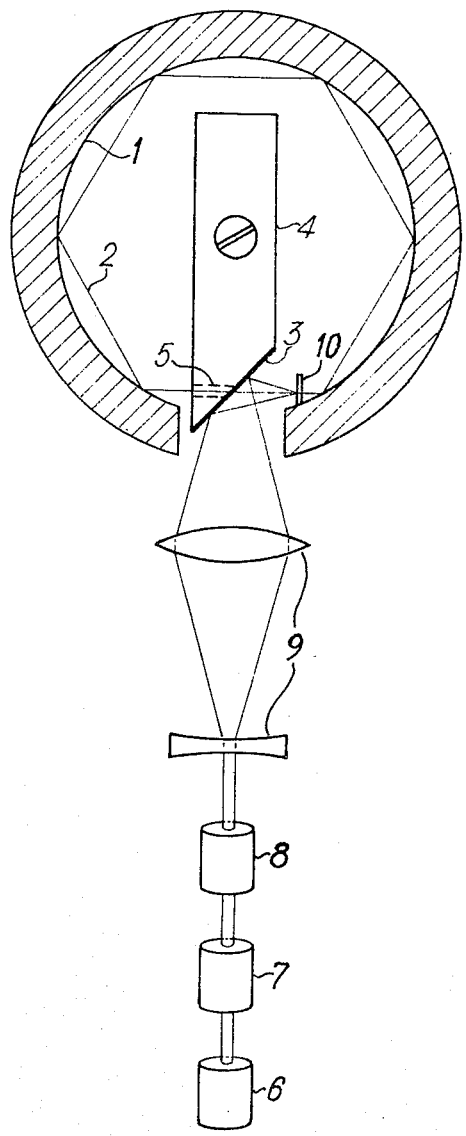
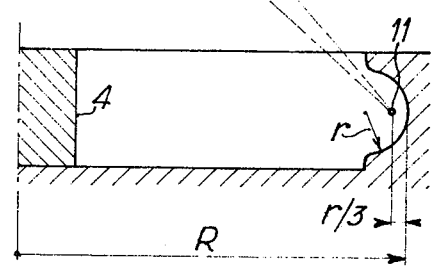
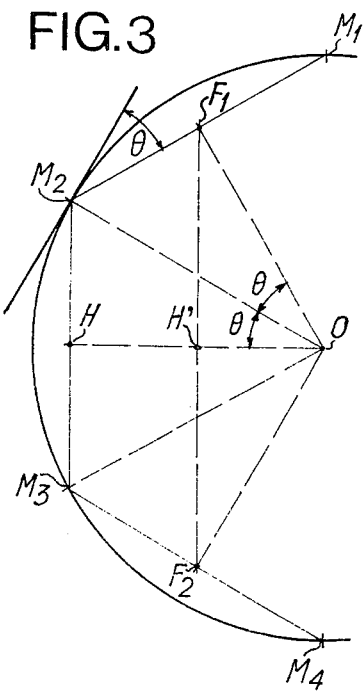

RING LASER FOR PENETRATING WAVES

This invention relates to a ring laser for penetrating electromagnetic waves (i.e. X and gamma rays) characterized in that a toroidal metal channel guiding the penetrating wave is used in combination with a pumping beam provided by a powerful visible-light or infrared laser, the power of which is focused on an active member or substance placed in a channel, via an inclined mirror having an aperture at its center for transmitting the penetrating radiation, the rest of the surface of the mirror reflecting the pumping radiation in the same direction as the penetrating beam.

According to one feature of the invention, the pumping beam has symmetry of revolution, e.g. of the kind produced by the device described in the U.S. Pat. application Ser. No. 410,216 for "Mode transformer for light or millimeter electromagnetic waves" filed by the present applicant on Oct. 26, 1973.

This mode, which is related to the $TE_{01}$ mode of circular wave guides has zero electric field intensity along its axis, so that the reflection of the pumping beam is not adversely affected by any aperture at the center of the reflecting mirror for transmitting the penetrating ray. Waves having symmetry of revolution also eliminate electrons separated in the region near the propagation axis, and are more easy to focus automatically than the other modes, and can thus give higher electric-field values for a given pumping power.

According to a feature of the invention relating to the production of coherent X rays, the active substance is a simple substance, the atomic number of which is dependent on the desired wave length, in accordance with Moseley's Law. The substance is placed across the channel guiding the penetrating radiation and its thickness is made such that the pumping radiation focused onto the substance may excite it throughout the said thickness.

According to another feature, the active medium is adapted to undergo thermonuclear fusion and emit gamma rays. The medium can be e.g. a boron hydride $BH_5$ or lithium hydride LiH or a boronate such a lithium boronate ($BLiH_4$). As is known, natural boron contains 20 % of $B^{10}$ isotope, which can react with a proton as follows:

$$_5B^{10} + {_1H^1} \rightarrow {_6C^{11}} + \gamma \qquad (1)$$

$\gamma$ representing the energy of a gamma photon having a wave length which is in the present case is approximately $2.10^{-3}$ A when the particles of the medium collide at speeds corresponding to temperatures of the corder of $8.10^6$ Celsius degrees. Carbon $_6C^{11}$ has a life of 20 minutes and disintegrates into boron $_5B^{11}$ emitting a $\beta^+$ particle which combines with an electron to give two gamma rays. With regard to the active laser medium, the part $_6B^{10}$, $_1H^1$ in a molecule such as $BH_5$ can be regarded as an excited state of $_6C^{11}$, and the gamma ray resulting from the de-excitation can easily produce other similar de-excitations accompanied by stimulated gamma emission, thus producing a state of super-radiance.

In the case of light waves, super-radiance occurs in a straight line, the stimulating wave determining the direction in which the stimulated photons are propagated. In the case of gamma rays, however, super-radiance is associated with considerable diffusion. The reason is that, in the case of light, the material is practically homogeneous on the scale of one wavelength, whereas in the case of gamma rays the wavelength is of the order of $10^{-3}$ A, i.e. less than the size of the molecules, only the part ($_6B^{10}$, $_1H^1$) of which is de-excited, whereas the rest of the molecule acts as an obstacle causing elastic diffusion of the emitted gamma rays. The diffusion is greater if, instead of using a hydride ($BH_5$) a boronate is used such as potassium boronate ($BKH_4$), because the K ion is a more massive obstacle than an H ion to the stipulated gamma rays. If lithium boronate ($BLiH_4$) is used, the lithium may undergo fusion and liberate additional energy.

Since the wavelength of the gamma rays is very short compared with the distances between atoms in the substance, they cannot be guided but only absorbed in lead. Owing to the diffusion, however, de-excitation does not occur along a straight line and super-radiance can occur only in the fusible material. Consequently, the situation is always the same as if the fusible material was guiding the gamma super-radiance. Furthermore, a critical radius exists for the channel containing the fusible material, for the following reasons. Since the stimulated radiation diagram has a maximum in the direction of stimulating radiation, amplification by super-radiance is at a maximum when the channel is straight and decreases at the same rate as the radius of curvature of the channel. Consequently, there is a certain radius of curvature at which the gain exactly compensates the losses. This is the radius which must be adopted for the circle described by the channel in which permanent super-radiance conditions are to be established.

In such cases, the pumping power is used only to start the reaction, which can continue by itself.

In one application of the invention, the heat produced by the absorption of gamma rays by the material surrounding the place where fusion occurs is used as a source of heat in a suitable known heat engine. This source is particularly convenient because, once the chain reaction has started, the metal medium containing the channel in which the reaction occurs can be separated from the laser which supplied the initial pumping power and which may be compared to a starting device.

In a variant of the last-mentioned application, the heating medium may even be secured to a mobile component of the engine.

In another variant, the gamma rays emitted by the system are discharged into water, where they produce considerable photo-dissociation, and the resulting mixture of oxygen and hydrogen is used in a heat engine.

In one embodiment, the thermonuclear fusion supplying power to the gamma-ray laser is controlled by diffracting a variable proportion of the rays of the caustic by introducing a member into their path, the depth to which the member is introduced being dependent e.g. on the channel temperature, or preferably on the intensity of the gamma rays radiated at a given point.

According to one feature, the toroidal guide channel is defined as follows:

Let:
- $r$ = the radius of the meridian circle of the torus;
- $R$ = the radius of the longest parallel;
- $\lambda$ = the wavelength of the radiation;
- $d$ = the side of an elementary cube of the crystal lattice when, for hard X rays, the metal forming the channel is recrystallized while hot (aluminum is particularly suitable for this operation);
$n$ = an integer; and
$\theta$ = the angle between the X ray and the wall at its point of impact.

Soft X rays (having a wavelength which is large with respect to the distance between atoms) are suitably reflected at grazing incidence; the maximum stability condition is obtained when the ratio between the radii $r$ and $R$ is given by:

$$r/R = 1 - \cos 2\theta / \cos \theta \approx 3\theta^2 \qquad (2)$$

The caustic, i.e. the region where the beam is most dense, is separated by a distance equal to $r/3$ from the equatorial circle forming the end of the channel.

In the case of hard X rays having a wavelength less than $d$, the Bragg condition must be added to the previously-defined optical conditions. We can then write:

$$r/R = \tfrac{3}{8}\, n\lambda/d^2 \qquad (3)$$

In the case of aluminum $d = 2.5$ A, then the equation can therefore be satisfied for $r = 1$ mm, $R = 24$ mm, $n = 4$ and $\lambda = 0.2$A.

In one application of the invention, the penetrating-ray laser is used for seeing macromolecules. To this end, the object to be viewed is placed in the caustic of the guided penetrating rays and photo-electric plates are used to record the diffraction patterns produced by diffusion from the nuclei in different directions.

The invention will be more clearly understood from the following description and accompanying drawings, in which:

FIG. 1 is a general view of the device according to the invention;

FIG. 2 is a meridian section of the guide channel shown in section and in plan view in FIG. 1; and FIG. 3 is a diagram illustrating the guide system.

FIGS. 1 and 2 show sections through the toroidal guide channel in two perpendicular planes. FIG. 2 shows the meridian section whereas FIG. 1 shows the section through an equatorial plane, denoted by 1 in a general diagram of the installation. In FIG. 1, reference 2 denotes the path of the beam of penetrating radiation. For simplicity, the path is shown as hexagonal but in practice the number of reflections of the beam on the channel is nearly always greater than 6 and often is not an integer. A metal mirror 3 is cut in a component 4 secured to the end of a metal cup having a rim in which the channel is cut. A groove is made in the channel so that a pumping beam coming from lenses (9,9) impinges upon mirror 3 and is reflected thereby in the axial direction along aperture 5 and through which the beam of penetrating rays travels through mirror 3. Aperture 5 is formed in mirror 3 and is part of component 4 so that the last-mentioned beam can travel through. The pumping power is supplied by lasers of the kind which most easily supplies the highest power at the shortest wavelength. The most suitable lasers at present are made from neodymium-doped glass.

FIG. 1 shows a master-oscillator 6 and associated modulator which convert the laser emission into a wave form comprising a series of pulses. Reference 7 denotes a mode transformer according to the aforementioned U.S. Patent application Ser. No. 410,216. The mode transformer converts the linearly-polarized waves from the master-oscillator and modulator into waves having symmetry of revolution and electric lines of force which are circles centered on the axis of the light beam. Reference 8 denotes an amplifier. Lenses (9,9) direct the beam toward a mirror 3 which reflects the beam and focuses it at 10. The substance to be excited, therefore, is placed at 10 at the focus of the pumping beam.

The X rays emitted by the such-excited substance are reflected at the end of channel 1, but it is clear that no rays can return to the material at 10 except those which are emitted in directions such that, after being reflected a number of times, they follow a path such as 2.

FIG. 2 is a cross-section of the device of FIG. 1 through a plane extending through the axis of revolution of the toroidal surface of the channel. FIG. 2 shows the caustic at position 11 at a distance $r/3$ from the end of the channel, the toroidal surface of which has a radius $r$. An observation device such as a photographic plate can be placed at 12 when it is desired to observe macromolecules, as explained hereinbefore.

The use of the mode transformed by 8 has a number of advantages. This mode is not interfered with the aperture 5 in mirror 3, and the atoms released are driven from the axis to the beam periphery, so that the radiation penetrates deeply into the material. Consequently, strongly ionized atoms occur in the path of the penetrating beam and are subjected to higher electric fields than in any other method since, as shown in the aforementioned application, the mode in question, which has symmetry of revolution, is more easily automatically focused than other modes.

In the case where the illuminated material is a simple substance, there are strongly ionized atoms and a lack of electrons on the axis of the incident beam. Consequently, the electric pumping field reaches the deep layers, where the ions are subjected to incoherent X rays coming from the ions at the periphery of the pumping beam, which are bombarded by excess electrons and act like a secondary pump. Thus, it is easier to act on layer K and produce stimulated X ray emission.

In the case where the illuminated substance is a boron hydride or boronate, boron and hydrogen nuclei stripped of electrons collect at the beam axis, and the electrons are driven to the periphery. Consequently, most of the beam power (the part not used for guiding the electrons to the periphery) is used to produce collisions between nuclei, which are travelling at different speeds. The resulting thermonuclear fusion leads to the emission of gamma rays which, more easily than any other radiation, produce fusion of the same kind as they were produced by. In the present case, therefore, a channel can be filled with boron hydrides or boronates which are relatively easily obtained in pulverulent form. A powerful pumping-wave pulse will produce in the material a state of gamma super-radiance which continues automatically, the energy being supplied by thermonuclear fusion. The fusion can be controlled simply by introducing into the channel a substance which reduces the intensity of the super-radiant gamma beam and diffuses it; the position of the substance is adjusted with the aid of a measurement of temperature or gamma radiance.

We shall now make a more detailed examination of the optical system of the guide channel.

Hagg & Karlsson have shown (Acta Crystallographica, Vol. 6, 1952, page 728, quoted by A. Guinier "Theorie et pratique de la radiocristallographie," Edition Dunod, Paris, 1964, page 201) that X rays can be reflected on "double-curvature crystals" at grazing incidence, provided that the Bragg condition is satisfied. In that case, the surface forming the reflector is a torus element taken near the equatorial circle; the reflecting material is aluminum, which is re-crystallized by heating after machining and polishing after crystallization.

The advantage of light nuclei such as aluminum is that they are most suited for elastic diffusion of hard X rays. Heavy nuclei more easily cause elastic diffusion of miscellaneous reactions, which are undesirable in the present case.

An X ray guide can comprise a circular channel, the surface of which is a region of a torus taken near the equator, cut in a material adapted to crystallize to form an assembly of mirrors similar to those of Hagg & Karlsson.

In such a case, the average radius of the beam (FIG. 3) describes a regular polygon in the equatorial plane of the channel; from the center of the channel, the angle between two adjacent corners of the polygon is $2\theta$.

Various methods can be used, depending on the radius given to the meridian circle.

Let $M_1, M_2, M_3, \ldots$ be the surface elements (hereinafter called mirrors) immediately surrounding the corners of the polygon formed by the average radius. If the wave is focused at the middle point $F_1$ between $M_1$ and $M_2$ and re-focused by $M_2$ at point H, halfway between $M_2$ and $M_3$, and then by $M_3$ at $F_2$, halfway between $M_3$ and $M_4$, the result is unstable, since a slight deviation of the rays from the equatorial plane will be amplified by successive reflections. This method, therefore, should be avoided (this result is well known in lens guide theory). On the other hand, stability is obtained by using groups of confocal lenses. In a group of this kind, any two lenses separated by a third lens are images of one another with respect to the third lens. Similarly, in the case of FIG. 3, $M_1$ and $M_3$ must be reciprocal images with respect to $M_2$. In the case of lenses, this means that the center $(F_1)$ of $(M_1-M_2)$ and the center $(F_2)$ of $(M_3-M_4)$ are reciprocal images, and that the rays form a parallel beam between $M_2$ and $M_3$. Arrangements which are equivalent in the case of lenses are not so in the case of mirrors, since mirrors are astigmatic. Since the X rays must be focused as far as possible from the channel, we must choose the condition shown in FIG. 3 (foci at $F_1$ and $F_2$ and parallel rays between $M_2$ and $M_3$). To this end, the "mirrors" consisting of the adjacent surfaces of $M_2$, $M_3$ must also contain points $M_2$ and $M_3$ when the invariable trapezium $F_1, M_2, M_3, F_2$ is pivoted around its base $F_1, F_2$. In other words, the radius of curvature of mirrors $M_2$, $M_3$ in planes perpendicular to $(F_1, F_2)$ must be equal to:

$$HH' = R(\cos \theta - \cos 2\theta) \qquad (4)$$

This radius, taken in a oblique plane, is converted to the main radius r taken in the normal or meridian plane by applying the Meunier theorem. We thus obtain:

$$r/R = 1 - (\cos 2\theta/\cos \theta) \approx 3/2 \, \theta^2 \qquad (5)$$

where $\theta$ is the angle between the rays and the tangential planes to the mirrors. To obtain a suitable reflection, angle $\theta$ must be related by the Bragg condition $$n = 2d \sin \theta \qquad (6)$$

to the side d of the cubes forming the crystal system and to the wavelength $\lambda$ of the radiation. If $\theta$, which is assumed to be small, is eliminated from equation (6) and equetion (5), we obtain condition (3).

The place of maximum concentration of X or gamma radiation is a caustic of the optical system, i.e. the circle of the equatorial plane inscribed in the polygon of rays and separated by a distance r/3 from the equatorial circle circumscribed around the same polygon. This distance can be expressed by:

$$R(1 - \cos \theta) \sim R \, \theta^2/2 \qquad (6a)$$

If we eliminate $\theta$ from (5) and the preceding formula, we obtain r/3.

Near the caustic, up to a distance of the order of the wavelength $\lambda$, the space is very brightly illuminated by the X rays. If, therefore, a small object such as a macromolecule is introduced into the caustic, the nuclei of the atoms thereof will diffuse the radiation and interference patterns of the diffused radiation can be recorded on a sensitive plate. In FIG. 2, reference 11 denotes the cross-section of the caustic and reference 12 denotes a plate sensitive to the radiation diffused by the nuclei of a macromolecule placed on the caustic.

Advantageously, the system is disposed in a fairly high vacuum so as to prevent diffusion by air, and the sensitive plate or plates are disposed at a distance such that the interference fringes are sufficiently wide to restore the image of the molecule when the plate is developed and thereafter illuminated by coherent light waves.

What I claim is:

1. A ring laser for producing penetrating electromagnetic waves such as x-rays and gamma rays from an active substance comprising:

circular wave guides having a zero electric field intensity along the axis of said wave guides;

pumping beam means comprising a primary light wave or IR laser, for providing a pumping beam having symmetry of revolution for incoming light and millimeter electromagnetic waves about its axis and electric lines of force which are circles centered on the axis of said beam means which coincides with the axis of said circular wave guides;

a reflecting mirror for reflecting the pumping beam along a line adjacent the center of said mirror to said active substance;

an aperture at the center of said mirror for transmitting said penetrating rays;

a channel, having a semi-toroidal cross-section, through said waveguide and between said pumping beam means and said reflecting mirror;

said active substance being capable of undergoing thermonuclear fusion upon the absorption of x-rays or gamma rays, said active substance being located in said channel and serving as the target for penetrating rays from said pumping means whereby the incoming light waves or infrared rays which penetrate said aperture undergo transformation into x-rays or gamma rays by absorption and emission by said active substance.

2. A ring laser according to claim 1, wherein said substance is boron hydride.

* * * * *